United States Patent
Memmott et al.

(10) Patent No.: US 9,748,004 B2
(45) Date of Patent: Aug. 29, 2017

(54) COMBINED CORE MAKEUP TANK AND HEAT REMOVAL SYSTEM FOR A SMALL MODULAR PRESSURIZED WATER REACTOR

(75) Inventors: Matthew J. Memmott, Pittsburgh, PA (US); Alexander W. Harkness, Gibsonia, PA (US); William Edward Cummins, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 858 days.

(21) Appl. No.: 13/495,069

(22) Filed: Jun. 13, 2012

(65) Prior Publication Data
US 2013/0336440 A1 Dec. 19, 2013

(51) Int. Cl.
| | |
|---|---|
| G21C 9/00 | (2006.01) |
| G21C 1/32 | (2006.01) |
| G21C 9/033 | (2006.01) |
| G21C 15/18 | (2006.01) |
| G21C 13/024 | (2006.01) |

(52) U.S. Cl.
CPC .......... G21C 9/00 (2013.01); G21C 1/322 (2013.01); G21C 9/033 (2013.01); G21C 15/18 (2013.01); G21C 13/024 (2013.01); Y02E 30/32 (2013.01)

(58) Field of Classification Search
USPC ........................................................ 376/406
See application file for complete search history.

(56) References Cited

U.S. PATENT DOCUMENTS

| | | | |
|---|---|---|---|
| 3,151,034 A | | 9/1964 | Douglass, Jr. et al. |
| 3,506,539 A | | 4/1970 | Rigg |
| 4,072,563 A | | 2/1978 | McDonald et al. |
| 4,753,771 A | * | 6/1988 | Conway et al. .............. 376/282 |
| 5,102,616 A | * | 4/1992 | Gardner et al. .............. 376/282 |
| 5,217,682 A | * | 6/1993 | Spinks .......................... 376/298 |
| 5,268,943 A | * | 12/1993 | Corletti et al. ............... 376/282 |
| 5,828,714 A | | 10/1998 | De Venne |
| 7,889,830 B2 | | 2/2011 | Gilmore et al. |
| 2008/0279326 A1 | | 11/2008 | Gilmore et al. |
| 2012/0321030 A1 | * | 12/2012 | Malloy et al. ................. 376/361 |

FOREIGN PATENT DOCUMENTS

| | | |
|---|---|---|
| CN | 1589482 | 3/2005 |
| CN | 1941217 | 4/2007 |
| GB | 2237441 | 1/1991 |

OTHER PUBLICATIONS

International Search Report for PCT/US2013/043201 dated Nov. 12, 2013 (Form PCT/ISA/210).

(Continued)

*Primary Examiner* — Jack W Keith
*Assistant Examiner* — Sharon M Davis
(74) *Attorney, Agent, or Firm* — Eckert Seamans Cherin & Mellott, LLC; Daniel C. Abeles

(57) ABSTRACT

A combined makeup tank and passive residual heat removal system that places a tube and shell heat exchanger within the core makeup tank. An intake to the tube side of the heat exchanger is connected to the hot leg of the reactor core and the outlet of the tube side is connected to the cold leg of the reactor core. The shell side of the heat exchanger is connected to a separate heat sink through a second heat exchanger.

14 Claims, 4 Drawing Sheets

(56) References Cited

OTHER PUBLICATIONS

Written Opinion of the International Searching Authority for PCT/US2013/043201 dated Nov. 12, 2013 (Form PCT/ISA/237).
International Preliminary Report on Patentability dated Dec. 24, 2014 for PCT/US2013/043201 (Forms PCT/IB/326, PCT/IB/373, PCT/ISA/237).
Nick SHulyak, Westinghouse Small Modular Reactor: Taking Proven Technology to the Next Level, [online], IAEA INPRO Dialogue Forum on Nuclear Energy Innovations: Common User Considerations for Small and Medium-Sized Nuclear Power Reactors, <URL: https://www.iaea.org/INPRO/3rd_Dialogue_Forum/12.SMR-Westinghouse.pdf, 2011, 19 pages.

\* cited by examiner

COMBINED CORE MAKEUP TANK AND HEAT REMOVAL SYSTEM FOR A SMALL MODULAR PRESSURIZED WATER REACTOR

CROSS REFERENCE TO RELATED APPLICATIONS

This application is related to U.S. patent application Ser. No. 13/495,083 filed concurrently herewith.

BACKGROUND

1. Field

This invention pertains generally to small modular pressurized water reactors and more particularly to a combined core makeup tank and heat removal system for such a reactor.

2. Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rods reduces the extent of neutron absorption and increases the rate of the nuclear reaction and the power output of the core.

FIG. 1 shows a simplified conventional nuclear reactor primary system, including a generally cylindrical pressure vessel 10 having a core closure head 12 enclosing a nuclear core 14 that supports the fuel rods containing the fissile material. A liquid coolant, such as water or borated water, is pumped into the vessel 10 by pump 16, through the core 14 where heat energy is absorbed and is discharged to a heat exchanger 18 typically referred to as a steam generator, in which heat is transferred to a utilization circuit (not shown) such as a steam driven turbine generator. The reactor coolant is then returned to the pump 16 completing the primary loop. Typically, a plurality of the above-described loops are connected to a single reactor vessel 10 by reactor coolant piping 20.

Commercial power plants employing this design are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both the limited space within the containment and the low cost requirement for integral pressurized light water reactors, the overall number of auxiliary systems needs to be minimized without compromising safety or functionality. For that reason, it is desirable to maintain all the components in fluid communication with the primary loop of the reactor system within the compact, high pressure containment. One such auxiliary system is the core makeup tank and another such system is the passive residual heat removal system. However, there is limited space within the containment to accommodate these several systems.

Therefore, it is an object of this invention to simplify the core makeup tank system and the passive residual heat removal system so that their components interfacing with the primary reactor loop can be supported within the high pressure, compact containment of a small modular pressurized water reactor.

Additionally, it is a further object of this invention to combine the features of the core makeup tank system and the passive residual heat removal system to reduce the space requirement for those systems within the high pressure, compact containment.

SUMMARY

These and other objectives are achieved by a small modular pressurized water reactor having a primary circuit including a reactive core, an upper internals, a steam generator heat exchanger and pressurizer housed within a reactor pressure vessel which is enclosed within a substantially close fitting containment. The small modular reactor includes a primary coolant hot leg between a coolant flow exit from the core and an upstream side of the steam generator heat exchanger and a primary coolant cold leg between a downstream side of the steam generator heat exchanger and a coolant flow entrance to the core, with the hot leg and cold leg housed within the reactor pressure vessel. The small modular pressurized water reactor further includes a combined passive heat removal system and high-head water injection system that employ a core makeup tank enclosed within the close fitting containment. The core makeup tank includes a heat exchange assembly having a primary side and a secondary side. The primary side has an interior flow path within the heat exchange assembly with a primary side inlet and a primary side outlet. A primary side inlet plenum is in fluid communication with the inlet of the interior flow path of the heat exchange assembly and the hot leg exiting the core. A primary side outlet plenum is in fluid communication with the outlet of the interior flow path of the heat exchange assembly and the cold leg between the downstream side of the steam generator heat exchanger and the coolant flow entrance to the core. A secondary side plenum within the secondary side of the heat exchange assembly has an inlet end and an outlet end and a secondary side flow path over an exterior of the heat exchange assembly interior flow path, connecting the inlet end to the outlet end of the secondary side plenum. An ultimate heat sink heat exchanger is connected to the core makeup tank between the inlet end and the outlet end of the secondary side plenum. The combined passive heat removal system and high-head water injection system further includes means for isolating the primary side of the heat exchange assembly from the core.

Preferably, the core makeup tank is positioned at an elevation above an elevation of the core and the ultimate heat sink heat exchanger is at an elevation above the elevation of the core makeup tank. Preferably, the core makeup tank is supported outside the reactor pressure vessel, but is enclosed within the containment, with the ultimate heat sink heat exchanger positioned outside the containment. Desirably, the primary side of the heat exchange assembly is pressurized to at least the same pressure as the core and preferably, substantially the same pressure as the core.

In one embodiment, the heat exchange assembly is a tube and shell heat exchanger, desirably with the primary side inlet plenum at a top of the core makeup tank and the primary side outlet plenum at the bottom of the core makeup tank. Desirably, the means for isolating the primary side of the heat exchange assembly from the core is a valve in fluid communication with the primary side outlet between the primary side outlet plenum and the cold leg.

In another embodiment, the secondary side plenum is pressurized to prevent boiling and, desirably, the ultimate heat sink includes a heat sink heat exchanger having a primary side connected to the secondary side of the core makeup tank heat exchange assembly and the heat sink heat exchanger having a secondary side in heat exchange relationship with a pool of coolant. In still another embodiment, the small modular reactor includes a plurality of such core makeup tanks.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
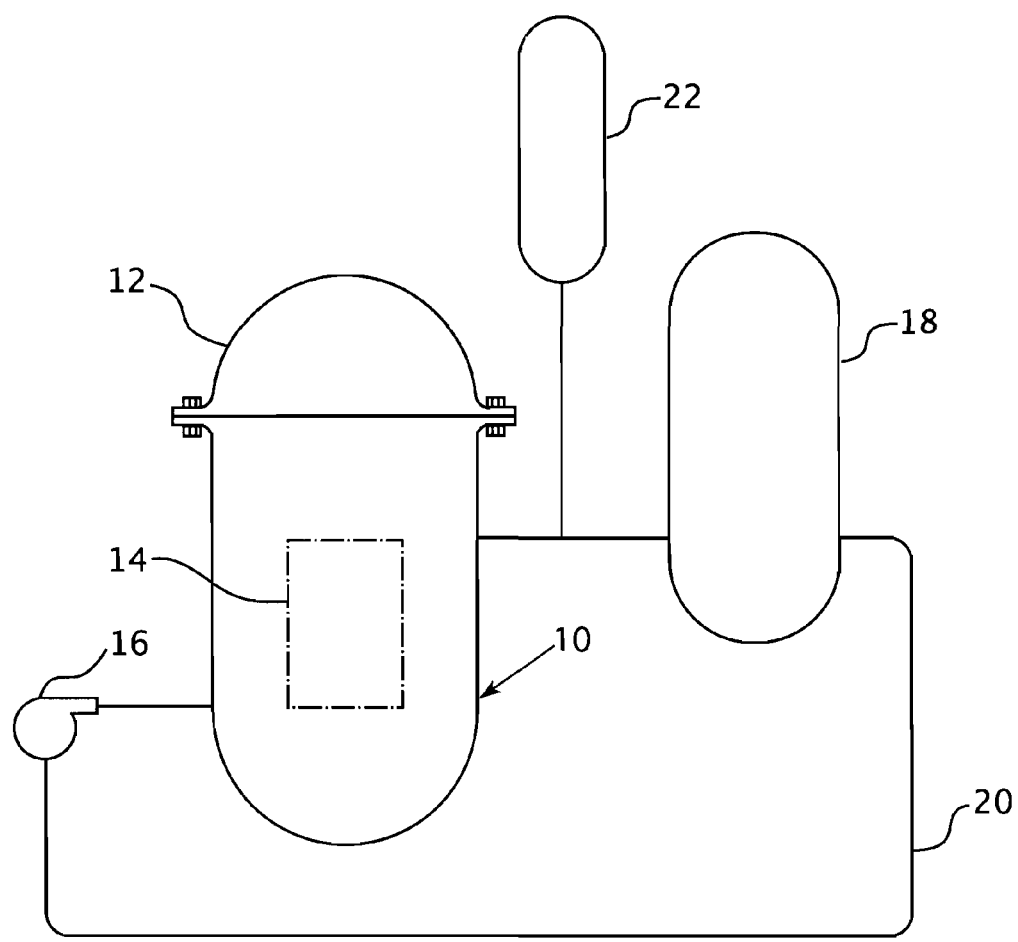
FIG. 1 is a simplified schematic of a conventional nuclear reactor system.
Figure 2:
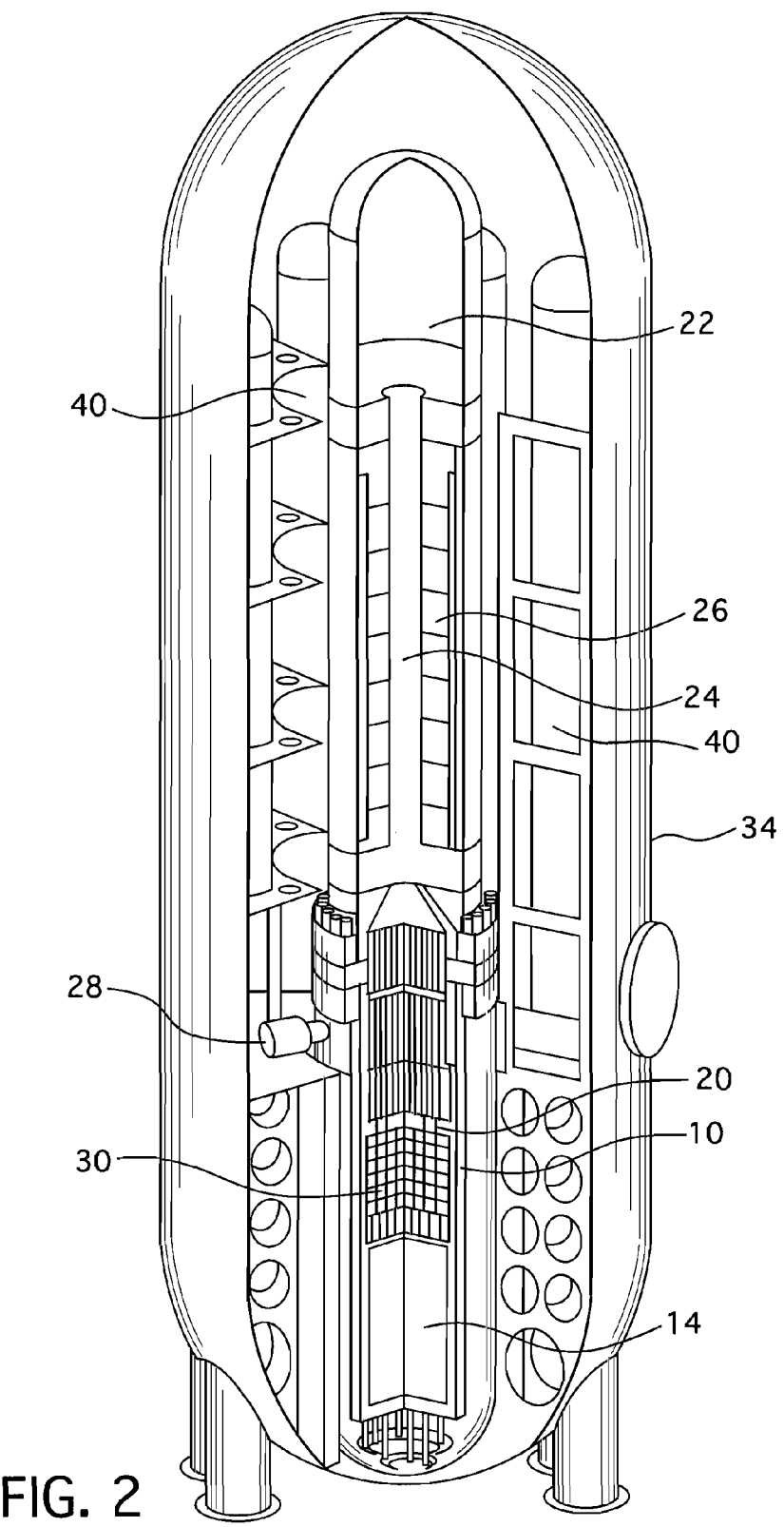
FIG. 2 is a perspective view, partially cut away, showing a small modular integral reactor system incorporating one embodiment of this invention.
Figure 3:
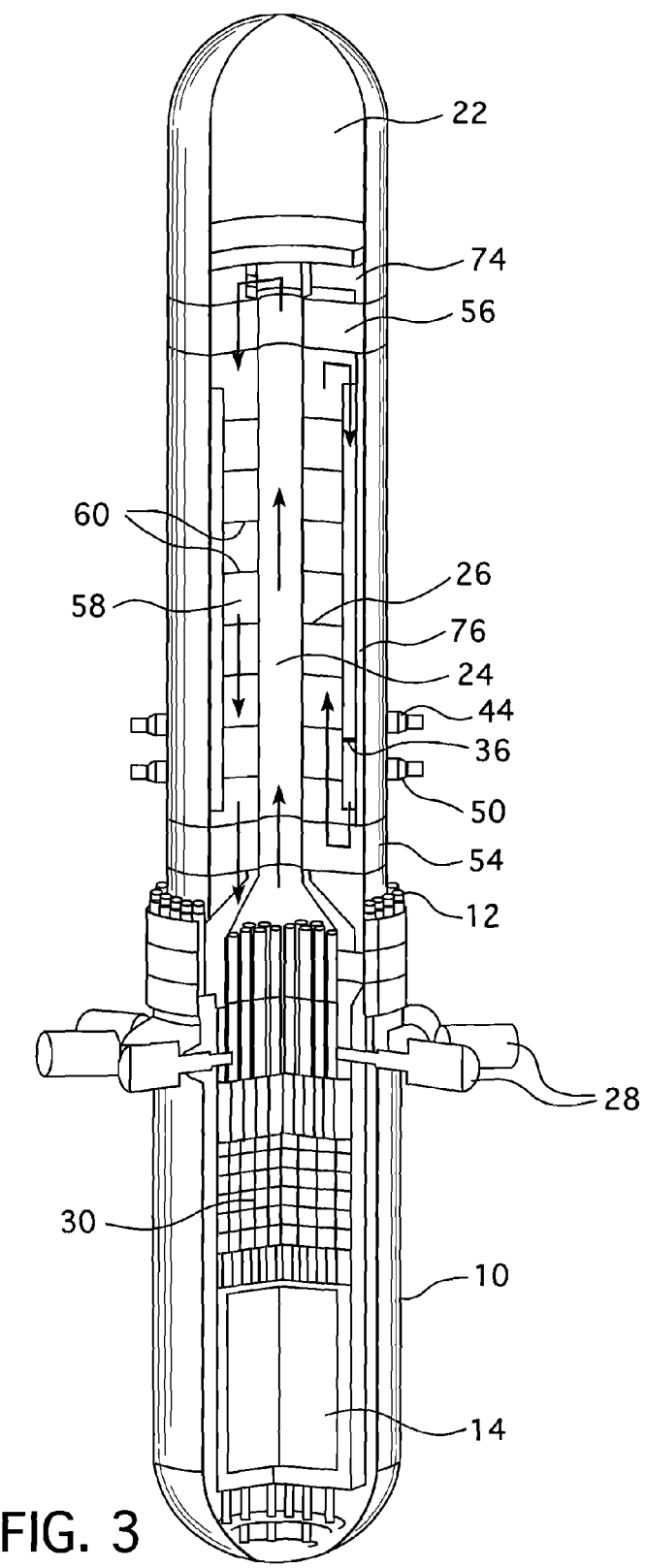
FIG. 3 is an enlarged view of the reactor shown in FIG. 2.
Figure 4:
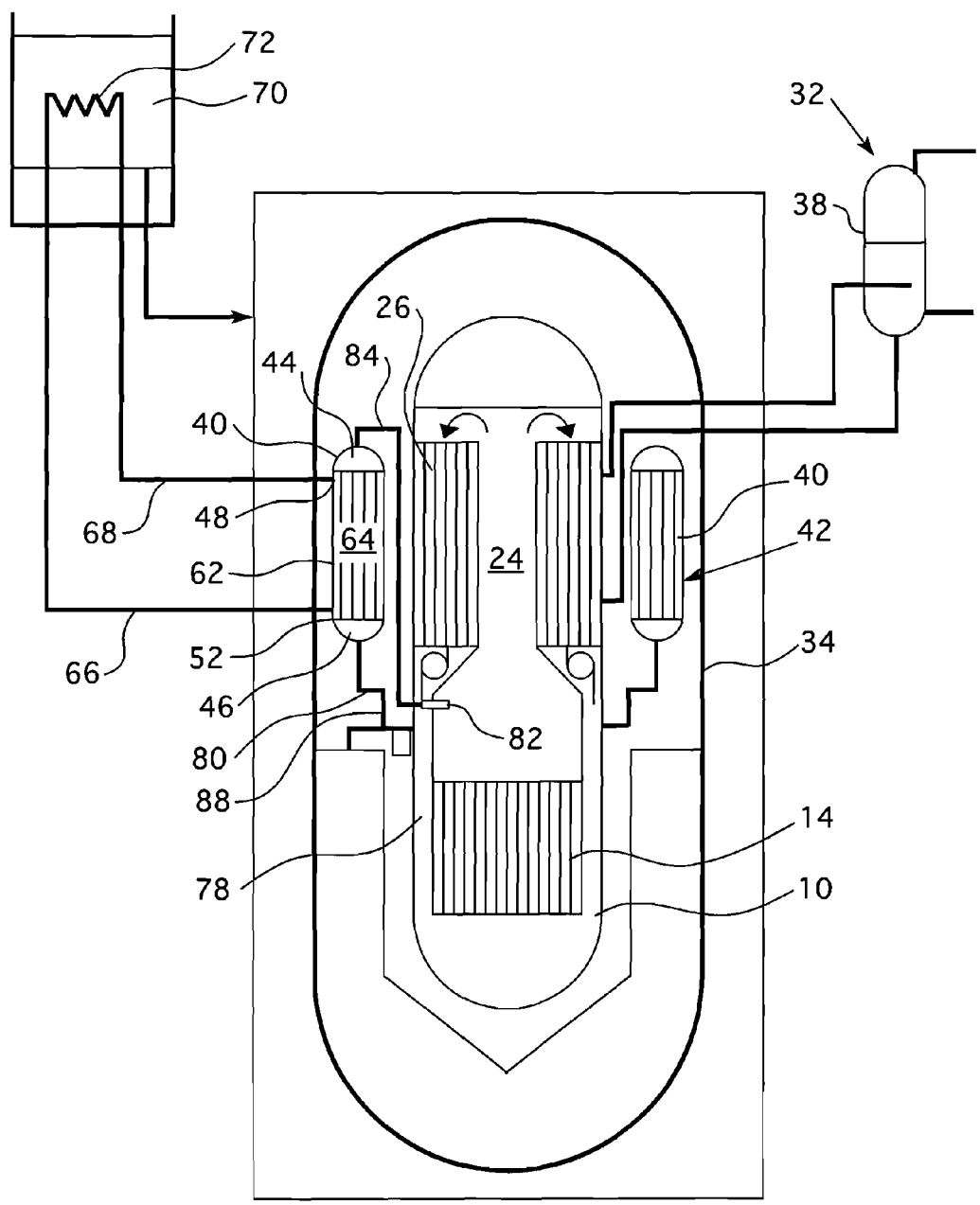
FIG. 4 is a schematic view of the reactor containment shown in FIG. 2 including the outside-reactor vessel components of the combined passive heat removal system and high-head water injection system of one embodiment of this invention and the outside-containment steam drum portion of the steam generator.

FIGS. 2, 3 and 4 illustrate a small modular reactor design which can benefit from the combined passive heat removal system and high-head water injection system claimed hereafter. FIG. 2 shows a perspective view of the reactor containment, partially cut away, to show the pressure vessel and its integral, internal components. FIG. 3 is an enlarged view of the pressure vessel shown in FIG. 2 and FIG. 4 is a schematic view of the reactor and some of the reactor auxiliary systems, including the ultimate heat sink and secondary heat exchange loop of the combined passive heat removal system and high-head water injection system of one embodiment of this invention. Like reference characters are used among the several figures to identify corresponding components.

In an integral pressurized water reactor such as illustrated in FIGS. 2, 3 and 4, all of the components typically associated with the primary side of a nuclear steam supply system are contained in a single pressure vessel 10 that is typically housed within a high pressure containment structure 34. The primary components housed within the pressure vessel 10 include the primary side of the steam generator, reactor coolant pumps, a pressurizer, and the reactor itself. The steam generator system 18 of a conventional reactor, in this integral reactor design, is broken down into two components, a heat exchanger 26 which is located above the upper internals 30 and a steam drum 32 which is maintained external to the containment 34 as shown in FIG. 4. The steam generator heat exchange 26 includes the pressure vessel 10/12 rated for primary design pressure and shared by the reactor core 14 and other conventional reactor internal components, two tube sheets 54 and 56, hot leg piping 24 (also referred to as the hot leg riser), heat transfer tubes 58 which extend between the lower tube sheet 54 and the upper tube sheet 56, tube supports 60, secondary flow baffles 36 for directing the flow of the secondary fluid medium among the heat transfer tubes 58 and secondary flow nozzles 44 and 50.

The heat exchanger 26/pressure vessel head 12 assembly is maintained within the containment 34. The external-to-containment steam drum 32 is comprised of a pressure vessel 38, rated for secondary design pressure. The external-to-containment steam drum 34 includes centrifugal type and chevron type moisture separation equipment, a feedwater distribution device and flow nozzles for wet steam, feedwater, recirculating liquid and dry steam, much as is found in a conventional steam generator design 18.

The flow of the primary reactor coolant through the heat exchanger 26 in the head 12 of the vessel 10 is shown by the arrows in the upper portion of FIG. 3. As shown, heated reactor coolant exiting the reactor core 14 travels up and through the hot riser leg 24, through the center of the upper tube sheet 56 where it enters a hot leg manifold 74 where the heated coolant makes a 180° turn and enters the heat transfer tubes 58 which extend through the upper tube sheet 56. The reactor coolant then travels down through the heat transfer tubes 58 that extend through the tube sheet 56 transferring its heat to a mixture of recirculated liquid and feedwater that is entering the heat exchanger through the sub-cooled recirculation input nozzle 50 from the external steam drum 32, in a counter-flow relationship. The sub-cooled recirculating liquid and feedwater that enters the heat exchanger 26 through the sub-cooled recirculation input nozzle 50 is directed down to the bottom of the heat exchanger by the secondary flow baffles 36 and up and around heat exchange tubes 58 and turns just below the upper tube sheet 56 into an outlet channel 76 where the moisture laden steam is funneled to the wet steam output nozzle 44. The wet saturated steam is then conveyed to the external steam drum 32 where it is conveyed through moisture separators which separate the steam from the moisture. The separated moisture forms the recirculating liquid which is combined with feedwater and conveyed back to the sub-cooled recirculation input nozzle 50 to repeat the cycle.

Both typical pressurized water reactor designs and advanced pressurized water reactor designs (such as the AP 1000® offered by the Westinghouse Electric Company LLC, Cranberry Township, Pa.) make use of both decay heat removal systems and high-head injection systems to prevent core damage during accident scenarios. In the Westinghouse small modular reactor design, illustrated in FIGS. 2, 3 and 4, cost and space constraints limit the capability of these systems as currently implemented in the larger pressurized water reactors. This invention provides a design for the combination of the passive decay heat removal and high-head water injection functions into a single, simple, integrated system. This combined safety system greatly simplifies the integral reactor design as compared to the larger pressurized water reactor safety systems, and allows for comparable reactor protection capabilities during accidents at a decreased cost and with lower spatial requirements. The embodiment of the invention claimed hereafter which is described herein includes a novel core makeup tank design with an internal passive residual heat removal heat exchanger that connects directly to the reactor vessel and a heat exchanger in the ultimate heat sink pool.

As can be viewed from FIGS. 2 and 4, the combined core makeup tank/passive residual heat removal heat exchanger 40 is located within the containment vessel 34. The passive residual heat removal heat exchanger 42 is located within the core makeup tank 40. The passive residual heat removal heat exchanger 42 includes an inlet plenum 44 at the top end of the core makeup tank and an outlet plenum 46 at the lower end of the core makeup tank. An upper tube sheet 48 separates the upper plenum 44 from a secondary fluid plenum 64 and a lower tube sheet 52 separates the lower plenum 46 from the secondary fluid plenum 64. A tube bundle 62 of heat exchange tubes extends between the upper tube sheet 48 and the lower tube sheet 52. Accordingly, primary fluid from the hot leg of the core 24, supplied through the inlet piping 84, enters the inlet plenum 44, is conveyed through the tube bundle 62 to the outlet plenum 46 and is returned to the cold leg 78 of the core 14 through the outlet piping 88. The coolant passing through the tube bundle 62 transfers its heat to a secondary fluid in the secondary fluid plenum 64 between the tube sheets 48 and 52. A secondary fluid enters the secondary fluid plenum 64 through the secondary fluid inlet piping 66, absorbs the transferred heat from the tube bundle 62 and exits through the secondary fluid outlet piping 68. The height of the core makeup tank 40, i.e., the elevation at which the makeup tank is supported, is maximized in order to facilitate high natural circulation flows. During steady state operation, the core makeup tank 40 and the tube side of the passive residual heat removal heat exchanger 42 is filled with cold, borated water at the same pressure as the reactor coolant. This water is prevented from flowing into the reactor pressure vessel 10 by a valve 80 on the exit piping 88 on the bottom of the core makeup tank.

During accident conditions, the reactor protection system signals the opening of the valve 80, allowing the cold, borated core makeup tank water to flow down through the exit piping 88 and into the cold leg region 78 of the reactor pressure vessel 10. Concurrently, hot reactor coolant then flows from the core exit region 82 into the core makeup tank 40 through the inlet piping 84, and then into the core makeup tank 40 inlet plenum 44. The hot reactor water then flows down through the tubes within the tube bundle 62 of the passive residual heat removal heat exchanger 42, and is cooled by cold secondary water flowing through the shell side of the passive residual heat removal heat exchanger in the secondary fluid plenum 64.

The secondary water, which is pressurized to prevent boiling, then flows upward through piping 68 to a second heat exchanger 72 in the ultimate heat sink tank 70, where it transfer heat to the cold water in the tank 70. The now cooled secondary water flows down through the return piping 66, and into the core makeup tank shell side 64 of the heat exchanger 42 to repeat the process. Both this ultimate heat sink loop and the core makeup tank primary loop are driven by natural circulation flows. The core makeup tank primary loop flow continues to remove decay heat from the reactor even after steam enters the core makeup tank inlet piping 84.

During an accident in which coolant is lost from the reactor pressure vessel 10, the water level in the reactor vessel drops as the passive residual heat removal heat exchanger 42 removes decay heat from the reactor 10. When the water level drops below the core makeup tank inlet piping entrance 82, steam enters the inlet piping and breaks the natural circulation cycle. At this point, the inventory of the core makeup tank (excluding the secondary shell side 64 of the passive residual heat removal heat exchanger) flows downward through the outlet piping under the steam pressure and into the reactor pressure vessel cold leg 78, effectively serving as high-head injection.

During refueling and outages, the core makeup tank/ passive residual heat removal system cools the reactor and internals. Any number of these core makeup tanks can be incorporated into the small modular reactor design in order to provide decay heat removal capacity, provided there is space in the containment 34.

Thus, the combined core makeup tank/passive residual heat removal system of this invention will remove heat equal to or greater than the decay heat emitted by the core during accident and shutdown conditions. Additionally, this system will provide sufficient borated water to the reactor pressure vessel to maintain safe shutdown of the core during all accident scenarios and will provide sufficient makeup water to maintain water levels above the top of the core during loss of coolant accident conditions. Furthermore, this system occupies minimal space within the containment by combining two safety functions into a single effective system.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A modular pressurized water reactor having a primary circuit including a reactive core, an upper internals, a steam generator heat exchanger and pressurizer housed within a reactor pressure vessel which is enclosed within a substantially close fitting containment, including a primary coolant hot leg between a coolant flow exit from the core and an upstream side of the steam generator heat exchanger and a coolant cold leg between a downstream side of the steam generator heat exchanger and a coolant flow entrance to the core, the hot leg and cold leg being housed within the reactor pressure vessel, the modular pressurized water reactor further including a combined passive heat removal system and high-head water injection system comprising:

a core makeup tank including:

a heat exchange assembly supported within the core makeup tank, the heat exchange assembly having a primary side and a secondary side, the primary side having an interior flow path within the heat exchange assembly with a primary side inlet and a primary side outlet, the interior flow path being maintained at a pressure at least equal to a pressure within the reactive core;

a primary side inlet plenum that is in fluid communication with the inlet of the interior flow path of the heat exchange assembly and the hot leg exiting the core;

a primary side outlet plenum that is in fluid communication with the outlet of the interior flow path of the heat exchange assembly and the cold leg between the downstream side of the steam generator heat exchanger and the coolant flow entrance to the core; and a secondary side plenum within the secondary side of the heat exchange assembly having an inlet end and an outlet end and a secondary side flow path over an exterior of the heat exchange assembly interior flow path, connecting the inlet end to the outlet end of the secondary side plenum;

an ultimate heat sink heat exchanger is connected to the core makeup tank between the inlet end and the outlet end of the secondary side plenum, wherein the secondary side plenum and a connection with the ultimate heat sink heat exchanger is pressurized to an extent to prevent boiling under accident conditions; and means for isolating the primary side of the heat exchange assembly from the core.

2. The modular reactor of claim 1 wherein the core makeup tank is positioned at an elevation above an elevation of the core.

3. The modular reactor of claim 2 wherein the ultimate heat sink heat exchanger is at an elevation above the elevation of the core makeup tank.

4. The modular reactor of claim 1 wherein the core makeup tank is supported outside of the reactor pressure vessel.

5. The modular reactor of claim 4 wherein the core makeup tank is enclosed within the containment.

6. The modular reactor of claim 5 wherein the ultimate heat sink is positioned outside of the containment.

7. The modular reactor of claim 1 wherein the primary side of the heat exchange assembly is pressurized to at least the same pressure as the core.

8. The modular reactor of claim 7 wherein the primary side of the heat exchange assembly is pressurized to substantially the same pressure as the core.

9. The modular reactor of claim 1 wherein the heat exchange assembly is a tube and shell heat exchanger.

10. The modular reactor of claim 9 wherein the primary side inlet plenum is at a top of the core makeup tank and the primary side outlet plenum is at a bottom of the core makeup tank.

11. The modular reactor of claim 1 wherein the means for isolating the primary side of the heat exchange assembly from the core is a valve in fluid communication with the primary side outlet between the primary side outlet plenum and the cold leg.

12. The modular reactor of claim 1 wherein the ultimate heat sink heat exchanger includes a primary side connected to the secondary side of the core makeup tank heat exchange assembly and a secondary side in heat exchange relationship with a pool of coolant.

13. The modular reactor of claim 1 including a plurality of core makeup tanks.

14. The modular reactor of claim 12 wherein the ultimate heat sink is outside the containment and the pool of coolant is substantially at atmospheric pressure of the surrounding environment.

* * * * *